United States Patent [19]

Kawano et al.

[11] Patent Number: 4,905,008
[45] Date of Patent: Feb. 27, 1990

[54] RADAR TYPE UNDERGROUND SEARCHING APPARATUS

[75] Inventors: Akio Kawano; Masaru Tsunasaki, both of Osaka, Japan

[73] Assignee: Osaka Gas Co., Ltd., Osaka, Japan

[21] Appl. No.: 238,096
[22] PCT Filed: Nov. 4, 1987
[86] PCT No.: PCT/JP87/00852
§ 371 Date: Jul. 5, 1988
§ 102(e) Date: Jul. 5, 1988
[87] PCT Pub. No.: WO88/03656
PCT Pub. Date: May 19, 1988

[51] Int. Cl.$^4$ .............................................. G01S 13/08
[52] U.S. Cl. ........................................ 342/22; 342/118
[58] Field of Search ................................ 342/72, 118

[56] References Cited

U.S. PATENT DOCUMENTS

| | | |
|---|---|---|
| 3,806,795 | 4/1974 | Morey . |
| 3,967,282 | 6/1976 | Young et al. ........................... 342/22 |
| 4,008,469 | 2/1977 | Chapman .................................. 342/22 |
| 4,062,010 | 12/1977 | Young et al. ...................... 343/719 X |
| 4,072,942 | 2/1978 | Alongi .................................... 342/22 |
| 4,218,678 | 8/1980 | Fowler et al. ........................... 342/22 |
| 4,502,009 | 2/1985 | Rodiere et al. ........................ 343/719 |
| 4,677,438 | 6/1987 | Michiguchi et al. .................. 342/22 |
| 4,691,204 | 9/1987 | Hiramoto ................................ 342/22 |
| 4,698,634 | 10/1987 | Alongi et al. ........................... 342/22 |
| 4,706,031 | 11/1987 | Michiguchi et al. ............... 342/22 X |
| 4,746,867 | 5/1988 | Gunton .............................. 342/22 X |

FOREIGN PATENT DOCUMENTS 57-176710 11/1982 Japan .
61-112283 7/1986 Japan .

*Primary Examiner*—Thomas H. Tarcza
*Assistant Examiner*—John B. Sotomayor
*Attorney, Agent, or Firm*—Stevens, Davis, Miller & Mosher

[57] ABSTRACT

This radar type underground searching apparatus is a system for detecting the presence and location of buried objects such as gas pipes buried in the ground. This apparatus includes a pulse generating unit which periodically generates pulse, and a transmitting antenna through which the pulse is sent into the ground. Pulses reflected from an object in the ground and reaching the ground surface are detected by a receiving antenna, and a reflected wave corresponding to each pulse wave received by the receiving antenna is amplified in a radio-frequency amplifier where in the amplification is increasing each time a group of pulses are transmitted. By sampling the output of the radio-frequency amplifier with a sampler at a series of reflex time, each being succeedingly delayed by a fixed period from the transmitting timing of each pulse wave, as the reference, a low-frequency signal which is formed by extending one reflected wave in time base is obtained, and the waveform thereof is displayed on a waveform display unit. On the screen of the display unit, the presence of objects will be detected by the presence of peaks in the low-frequency signal caused by the reflection from the objects and the depths of the objects will be detected by the time at which the peaks appear on the screen. By this construction, the attenuation of radio waves in the ground can be compensated without arising waveform distortion.

1 Claim, 7 Drawing Sheets

RADAR TYPE UNDERGROUND SEARCHING APPARATUS

TECHNICAL FIELD

This invention relates to a radar type underground searching apparatus which detects the presence and location of objects buried in the ground such as gas pipes in the ground.

The radar type underground searching apparatus of this kind has an arrangement in which pulses of the microwave band are transmitted from the ground surface into the depths thereof and reflected waves caused by objects such as gas pipes are detected. The radar type underground searching apparatus detects the presence of objects buried in the ground by measuring peak pulses and finds the location (depth) of the objects by measuring the interval from the transmission of pulses to the occurrence of peaks of the pulses reflected.

TECHNICAL BACKGROUND

The conventional radar type underground searching apparatus has the same construction as that disclosed in the Transactions of the Institute of Electronics, Information and Communication Engineerings of '83/6 vol. J66-B No.6;713-720 in general, in which, as shown in FIG. 8, a transmitting antenna 52 and a receiving antenna 53 are arranged side by side on the ground surface 51. Pulses of the microwave range generated at a pulse generating unit 54 are transmitted into the ground 55 by way of the transmitting antenna 52 and pulses reflected by objects 56A and 56B in the ground 55 are received by the receiving antenna 53 on the ground surface 51. The pulses received are then fed to a radio-frequency amplifier unit 57 to be amplified in radio-frequency and the output from the radio-frequency amplifier 57 is utilized to detect the presence and the depth of the objects 56A and 56B.

The conventional radar type underground searching apparatus thus constructed is generally used to search for objects such as 56A or 56B which is buried under the ground at a depth ranging from several tens of centimeters to several meters. The propagation speed of radio waves (pulses) used for the search in the ground 55 is, when assuming the dielectric constant of soil is 9 for example, equivalent to $1/9^{\frac{1}{2}} = \frac{1}{3}$ of the propagation speed in space (30 cm/ns), that is, 10 cm/ns. Accordingly, the time elapsed for radio waves to travel from the transmitting antenna 52 to the receiving antenna 53 by way of 56A or 56B will be very short such as 10 ns, 20 ns, or 40 ns when the depth to the objects is 50 cm, 1 m, or 2 m respectively. Different from a case where the radio wave travels through space, large attenuation in proportion to the exponent of the depth will take place when the radio wave travels through the ground 55, and the amount of attenuation may become as large as $\frac{1}{3}$ to 1/10 in a depth of 1 m. Assuming the amount of attenuation is $1/10^{\frac{1}{2}} = \frac{1}{3}.16$ in a depth of 1 m, amounts of attenuation in depths of 50 cm, 1 m, and 2 m are respectively $1/10^{\frac{1}{2}}$, 1/10, and 1/100 to show a great change. For example, when the reflected wave from an object buried in a depth of 1 m is attenuated to 1/10 with respect to the transmitted wave, the attenuation will become 1/100 for an object buried in a depth of 2 m. This makes it difficult to search for objects deeply buried in the ground.

To improve the low searching ability for the object 56B in the depths in the ground because of the attenuation of the radio wave and to make the search for the object 56B as effective as for the object 5A buried in a shallow depth in the ground, the conventional radar type underground searching apparatus has the radio-frequency amplifier unit 57 integrally provided with a sensitivity time control circuit. This circuit makes it possible, that the greater the time elapsed between the transmission and the reception of the radio wave becomes, that is the greater the depth of the object 56A or 56B becomes, the more the amplification of the radio-frequency amplifier unit 57 is made increased. Consequently, the difference of the object 56A and 56B in attenuation of the radio wave because of the difference in depth will be compensated so that the peaks of the reflected waves caused by the shallow object 56A and the deep object 56B are made approximately equal.

FIG. 9 shows a timing chart at every stage of the conventional radar type underground searching apparatus. The chart (A) shows a voltage waveform of pulses transmitted from the transmitting antenna 52 in which a solid line indicates a base band wave of 3 ns in pulse width and a broken line indicates a mono-pulse wave. The chart (B) shows a voltage waveform of reflected pulses fed to the radio-frequency amplifier unit 57 by way of the receiving antenna, in which a first peak $P_{11}$ is caused by reflected pulses from the ground surface 51. A second peak $P_{21}$ is caused by an object in a depth of 50 cm in the ground in which the reflex time t (an interval measured from the instant of zero when pulses are transmitted to the instant when the pulses are fed back to the receiving antenna 53) is 10 ns and whose amplitude is $1/10^{\frac{1}{2}}$ of that of the first peak $P_{11}$. A third peak $P_{31}$ has a reflex time of 20 ns and is caused by an object in a depth of 1 m, and whose amplitude is 1/10 of that of the first peak $P_{11}$. A fourth peak $P_{41}$ has a reflex time of 40 ns and is caused by an object in a depth of 1 m, and whose amplitude is 1/100, and whose amplitude is 1/100 of that of the first peak $P_{11}$. The chart (C) shows a time-dependent variation of the amplification of the radio-frequency amplifier unit 57, in which the amplification varies according to the time elapsed from zero period, that is, the amplifications at t=10 ns, t=20 ns, and t=40 ns are respectively $10^{\frac{1}{2}}$ times, 10 times, and 100 times of the amplification at the reflex time t=0. The chart (D) shows an output voltage waveform from the radio-frequency amplifier unit 57, in which peaks $P_{22}$ through $P_{42}$ caused by objects in depths of 50 cm, 1 m, and 2 m respectively are approximately equal in level to a peak $P_{12}$.

The reflected wave is, as mentioned above, a radio-frequency signal in the range of microwaves. It is operationally sufficient for underground search performance only to detect the presence of the peaks $P_{22}$ through $P_{42}$ and the time of occurrence thereof. In this connection, the conventional radar type underground searching apparatus converts the radio-frequency signal into a low frequency signal of the audio range by a low-frequency converter unit 58 whose waveforms are displayed on a waveform display unit 59 such as a synchroscope (the time base of which corresponds to the depths of the objects 56A and 56B) so that an operator can visually search for the objects 56A and 56B (to determine the presence and the location of the object 56A and 56B).

The low-frequency converter unit 58 mentioned above performs the conversion of radio-frequency signals to low-frequency signals by way of sampling, in which the reflected pulses for the transmitted pulses which are periodically transmitted are respectively sampled for one time with a delayed timing of a fixed period to obtain a low-frequency signal which is formed by extending these pulses in time base.

The sampling operation will now be described in detail by a set of timing charts in FIG. 10. The chart (A) shows a voltage waveform of pulses periodically transmitted, (B) shows a voltage waveform of reflected, pulses corresponding to the pulse of the chart (A), and (C) shows a part of low-frequency signal in one reflected pulse of the waveform shown in the chart (B) extended in time base. In FIG. 10, the pulses are repeatedly transmitted at a period of T and the reflected pulses occur at the corresponding period. Assuming the sampling period of the reflected pulses is $T + \Delta T$ in this case, the sampling is performed at a series of periods of $t=0$, $T+\Delta T$, $2(T+\Delta)$, $3(T+\Delta T)$, and so on. When considered with respect to the transmitting period as a reference the sampling for the first reflected pulses is performed at $t'=0$, the second reflected pulses at $t'=\Delta T$, the third reflected pulses at $t'=2\Delta T$, and the fourth reflected pulses at $t'=3\Delta T$. As a result, if each reflected wave is identical in waveform to each other, the same sampling data as taken by sampling one reflect wave at every $\Delta T$ is obtained at every $t + \Delta T$. By feeding this sampling data to a low-pass filter, the low-frequency signal in FIG. 10(C), which is produced by extending one reflected pulse in the waveform in FIG. 10(B) $(T+\Delta T)/\Delta T$ times, can be obtained.

The above mentioned procedure will now be described giving actual figures. The period during which the sampling of the reflected pulses searching period is performed depends upon the dielectric constant of the soil concerned. When the searching is performed for a depth of approximately 5 m in the ground whose soil has the dielectric constant of 9, the period may be from the transmission of pulses to the time when reflex time of 100 ns is reached. Assuming that pulses are transmitted at a period of 50 μs and the number of samples during the searching period is 1000, the pulses should be transmitted 1000 times to obtain one low-frequency signal, which requires the searching period of 50 ms (=50 μs×999+100 ns). In this case, a reflected pulse of 100 ns in length is converted into a low-frequency signal of 50 ms in length so that the period at which the low-frequency signal is produced may be set to 50 ms or more.

The following table shows the relationship between the pulse number and the sample timing.

TABLE 1

| Pulse number | Sample timing |
|---|---|
| 0 | 0 sec |
| 1 | $1 \times \left( 50 \; \mu s + \frac{100 \; ns}{1000} \right)$ |
| 2 | $2 \times \left( 50 \; \mu s + \frac{100 \; ns}{1000} \right)$ |
| i | $i \times \left( 50 \; \mu s + \frac{100 \; ns}{1000} \right)$ |

TABLE 1-continued

| Pulse number | Sample timing |
|---|---|
| 999 | $999 \times \left( 50 \; \mu + \frac{100 \; ns}{1000} \right)$ |

In FIG. 8, the reference numeral 60 indicates a control unit which controls the operational timing of the pulse generator unit 54, radio-frequency amplifier unit 57, and low-frequency converter unit 58. Antennas for use with underground searching systems such as used in the conventional radar-type underground searching apparatus as the transmitting antenna 52 and the receiving antenna 53 will now be described. Antennas of this kind are required to have a return loss characteristic which is flat in the range of 50 MHz to 400 MHz and free of ringing effect in general.

The antenna described herein has approximately the same structure as the one disclosed in Japanese Patent Publication No. 044916 of 1980 and is provided with a pair of antenna elements 71 and 72 of identical flat plates having a shape of an acute isosceles triangle which are symmetrically arranged in a plane with their vertexes 71a and 72a abutted to each other as shown in FIG. 11.

The antenna elements 71 and 72 are respectively provided with at their both ends strip-shaped conductors 77 and 78 as well as 79 and 80. The conductors 77 and 78 are respectively arranged with their one ends spaced from both base ends 71b and 71c of the antenna element 71 about 1 cm and the conductors 79 and 80 are respectively arranged with their one ends spaced from both base ends 72b and 72c of the antenna element 72 about 1 cm. The other ends of the conductors 79, 80 and the other ends of the conductors 77, 78 are spaced about 1 cm apart. Further, load resistors of about 150 Ω 73 through 76, 81 and 82 are respectively connected between the base end 71b and the one end of the conductor 77 as well as 71c and 78; between the base end 72b and the one end of the conductor 79 as well as 72c and 80; between the other end of the conductor 77 and the other end of the conductor 79 as well as the other end of the conductor 78 and the other end of the conductor 80.

The vertexes 71a and 72b of the pair of the antenna elements 71 and 72 are feeding points to which the pulse generating unit (base band pulser) 54 is connected through a balun 53, and pulses from the pulse generating unit 54 are then transmitted through the pair of the antenna elements 71 and 72 as radio waves.

The vertexes 71a and 72a are fixed to an insulated balun case which contains the balun 83 and a bottom opened housing 85 made of aluminum and lined with ferrite encloses the assembly including the pair of the antenna elements 71 and 72 together with the balun case 85. In this case, the plane in which the pair of the antenna elements 71 and 72 is arranged is made flush with the plane of the opening surface of the housing 85. The pair of the antenna elements 71 and 72 is connected to the pulse generating unit 54 (see FIG. 8) in a circuit block 91 mounted on the rear side of the housing 85 through a connector 86 provided on the balun case 84, a coaxial cable 87, a connector 88, a coaxial cable 89, and a connector 90. The transmitting output from the pulse generating unit 54 in the circuit block 91 then fed to the pair of the antenna elements 71 and 72 through the connector 90, the coaxial cable 89, the connector 88, the coaxial cable 87, the connector 86, and the balun 83. Pulses are then finally transmitted from this pair of the antenna elements 71 and 72.

The conventional radar type underground searching apparatus mentioned above has such a drawback that it is necessary for the ordinary operation to increase the amplification of the radio-frequency amplifier unit 57 10 to 100 times within a period of several tens of nanoseconds, which causes distortion including the production oscillations on the reflected pulses to result in a limited improvement in searching ability and resolution.

On the other hand, when the sensitivity time control is performed in the range of low-frequency signals, that is, when it is performed after the sampling operation, there is another problem to occur. To convert radio-frequency signals it is necessary to perform sampling as mentioned above, and in this conversion there occurs inherently a sampling noise of about several millivolts. Assuming that there is a sampling noise of 5 mV, it is amplified to 50 mV when the amplification in the low-frequency range is 10, and frequency range is 10, and it is amplified to 500 mV when the amplification is 100. That is, the more the amplification is increased to amplify weak reflected pulses from the depths in the ground, the greater the sampling noise becomes, which prevents the searching ability from getting improved.

The antenna of the conventional underground searching apparatus has a wide, omnidirectional directivity, which is not suitable for the performance of searching for objects buried in the ground. That is, when the antenna is used as a transmitting one, there is a lot of leakage radio waves dissipated into space and as a result, an effective radio wave transmission into the ground will not be expected. In addition, the radio wave transmitted is widely scattered in the ground before it is reflected back to the receiving antenna, which prevents the detection accuracy for buried objects from getting improved. When the antenna of this kind is used as a receiving antenna, it accepts noise signals through space and as well as reflected waves from a number of objects scattered over a wide area in the ground. This also contributes to lower the deflection accuracy for buried objects.

A first object of the present invention is, therefore, to provide a radar type underground searching apparatus in which the searching ability and resolution can be improved.

A second object of the present invention is to provide an antenna for ground searching having a narrow directivity by which the detection accuracy for buried objects can be improved.

SUMMARY OF THE INVENTION

According to the present invention, pulses having peaks of a fixed value are generated by a pulse generating unit, and are sent into the ground through a transmitting antenna. Pulses reflected from an object in the ground and reaching the ground surface are detected by a receiving antenna, and a reflected wave corresponding to each pulse wave received by the receiving antenna is amplified in a radio-frequency amplifier where in the amplification is increased each time a group of pulses are transmitted. By sampling the output of the radio-frequency amplifier with a sampler at a series of reflex times, each being succeedingly delayed by a fixed period from the transmitting timing of each pulses, a low-frequency signal which is formed by extending these pulses in time base is obtained, and the waveform thereof is displayed on a waveform display unit. On the screen of the display unit, the presence of objects will be detected by the presence of peaks in the low-frequency signal caused by the reflection from the objects and the depths of the objects will be detected by the time at which the peaks appear on the screen with respect to the transmitting timing of the pulse wave.

According to the construction of the invention, by sampling the output of the radio-frequency amplifier at a series of reflex time, each being succeedingly delayed by a fixed period from the transmitting timing of each pulses taking as the reference, a low-frequency signal which is formed by extending one refeleted wave in time base is obtained. Because of this procedure, the apparatus of the present invention can compensate the difference in attenuation of radio waves caused by the difference of buried objects in depth without causing distortion on the reflected wave to result in an improved searching ability and resolution.

In the case of the present invention, the transmitting antenna and receiving antenna comprise a pair of antenna elements which is made of a pair of plates shaped like an isosceles triangle bent obtuse angled in half with the fold line generally running parallel with the base thereof. The triangle antenna elements are symmetrically abutted to each other at their respective vertexes with their trapezium portions laid in a plane in general. The antenna is further provided with a first and a second load resistors connected at their one ends to both ends of the trapezium base of one antenna element and a third and a fourth load resistors at their one ends connected to both ends of the trapezium base of the other antenna element, a first and a second conductors connected at their one ends to the other ends of the first and second load resistors, a third and a fourth conductors connected at their one ends to the other ends of the third and the fourth load resistors, a fifth load resistor connected between the first and the third conductors, and a sixth load resistor connected between the second and the fourth conductors.

Because of the construction of the transmitting and receiving antennas as described above, the pair of the antenna elements can be made to have a narrow directivity along the longitudinal direction thereof. By performing seaching operation while moving such a pair of antenna elements along its longitudinal direction, the detection accuracy for buried objects can be improved and the radiation efficiency of radio waves can be increased as well since the directivity of the pair of the antenna elements in the direction perpendicular to the longitudinal direction thereof remains to be wide.

Therefore, by performing searching operation while moving such a pair of antenna elements along its direction perpendicular to the longitudinal direction thereof, the presence and location of objects buried in the ground in a wide area can be detected, although roughly, in a relativery short period. Thus, by combining the searching procedures mentioned above, that is, by performing searching operation in both longitudinal direction of the pair of the antenna elements and the direction parpendicular thereto, a searching operation for objects buried in the ground in a wide area can be performed in a short period with a high degree of accuracy.

PREFERRED EMBODIMENTS OF THE INVENTION

Figure 1:
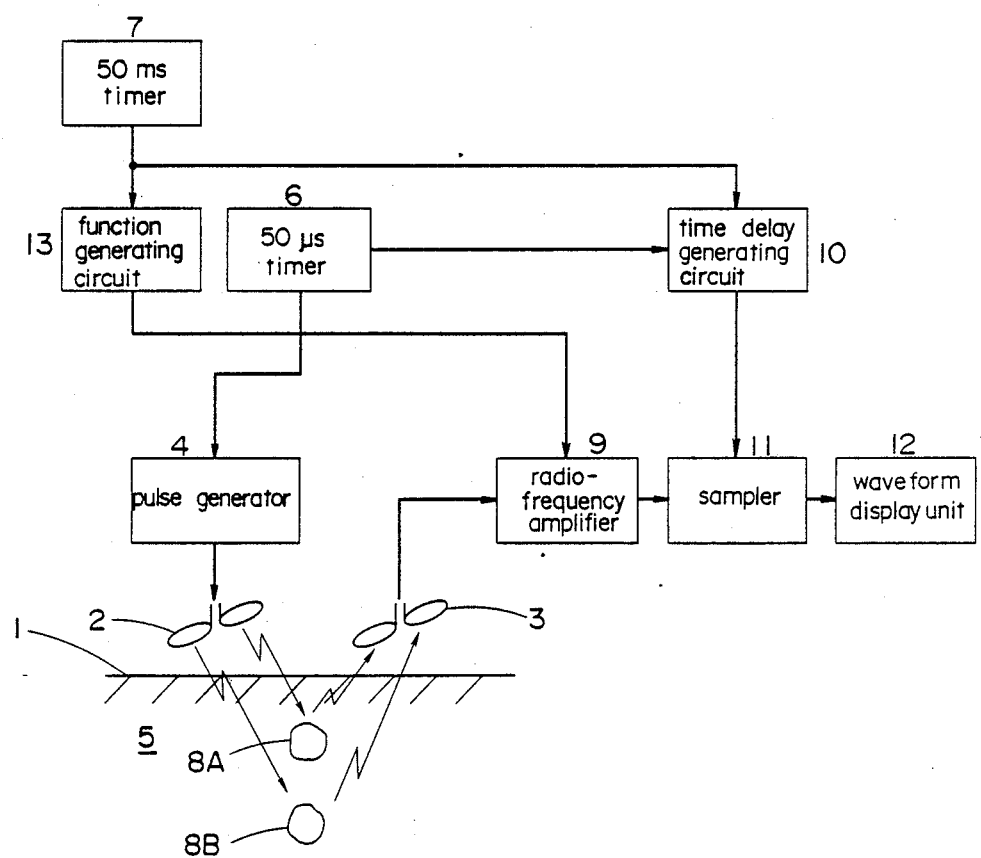
FIG. 1 is a block diagram showing the structure of an embodiment of the present invention.

One embodiment of the present invention will now be explained referring to FIG. 1 through FIG. 7. The radar type underground searching apparatus has a transmitting antenna 2 and a receiving antenna 3 arranged side by side (adjacent to each other), as shown in FIG. 1, on the ground surface 1. Pulses of the base band generated by a pulse generator 4 such as a base band pulser are transmitted into the ground 5 by way of the transmitting antenna 2. In this case, the pulse generator 4 utilizes a 50 μs timer 6 so as to transmit base band pulses of a fixed peak at every 50 μs into the ground 5.

Pulses reflected by objects 8A and 8B in the ground 5 are received by the receiving antenna 3 on the ground surface 1. The pulses received are then fed to a radio-frequency amplifier 9 to be amplified in radio-frequency and gets sampling action by a sampler 11 as well as being low-pass filtered to be converted into a low-frequency signal which is formed by extending these pulses in time base and displayed on a waveform display unit 12 such as a synchroscope.

By a function generator 13 which is driven by a 50 ms timer 7 at every 50 ms to produce a monoincreasing function such as an exponential function, the amplification of the radio-frequency amplifier 9 will be increased as time goes on within 50 ms. In this case, although the amplification increases monotonously generally within 50 ms, it will change generally in a sawtooth shape in a span longer than 50 ms, that is, the function generator 13 produces approximately a sawtooth wave signal of a 50 ms period.

The sample timing of the sampler 11 is determined by the 50 ms timer 7, 50 μs timer 6 and delay time generating circuit 10. The delay time generating circuit 10 is driven by the 50 ms timer 7 and counts the number of outputs applied thereto. It produces pulses with a delay time of 0 when the output of the 50 ms timer 7 is applied thereto while the output of the 50 μs timer 6 is applied, it produces pulses with a delay time of $(100 \text{ ns} \times i)/1000$ according to the number of outputs i to drive the sampler 11.

The following table shows the relationship between the pulse number and the sample timing.

TABLE 2

| Pulse number | Sample timing |
| --- | --- |
| 0 | $\Delta$ |
| 1 | $1 \times \left(50 \ \mu s + \frac{100 \ ns}{1000}\right) + \Delta$ |
| 2 | $2 \times \left(50 \ \mu s + \frac{100 \ ns}{1000}\right) + \Delta$ |
| i | $i \times \left(50 \ \mu s + \frac{100 \ ns}{1000}\right) + \Delta$ |
| 999 | $999 \times \left(50 \ \mu s + \frac{100 \ ns}{1000}\right) + \Delta$ |

Figure 2:
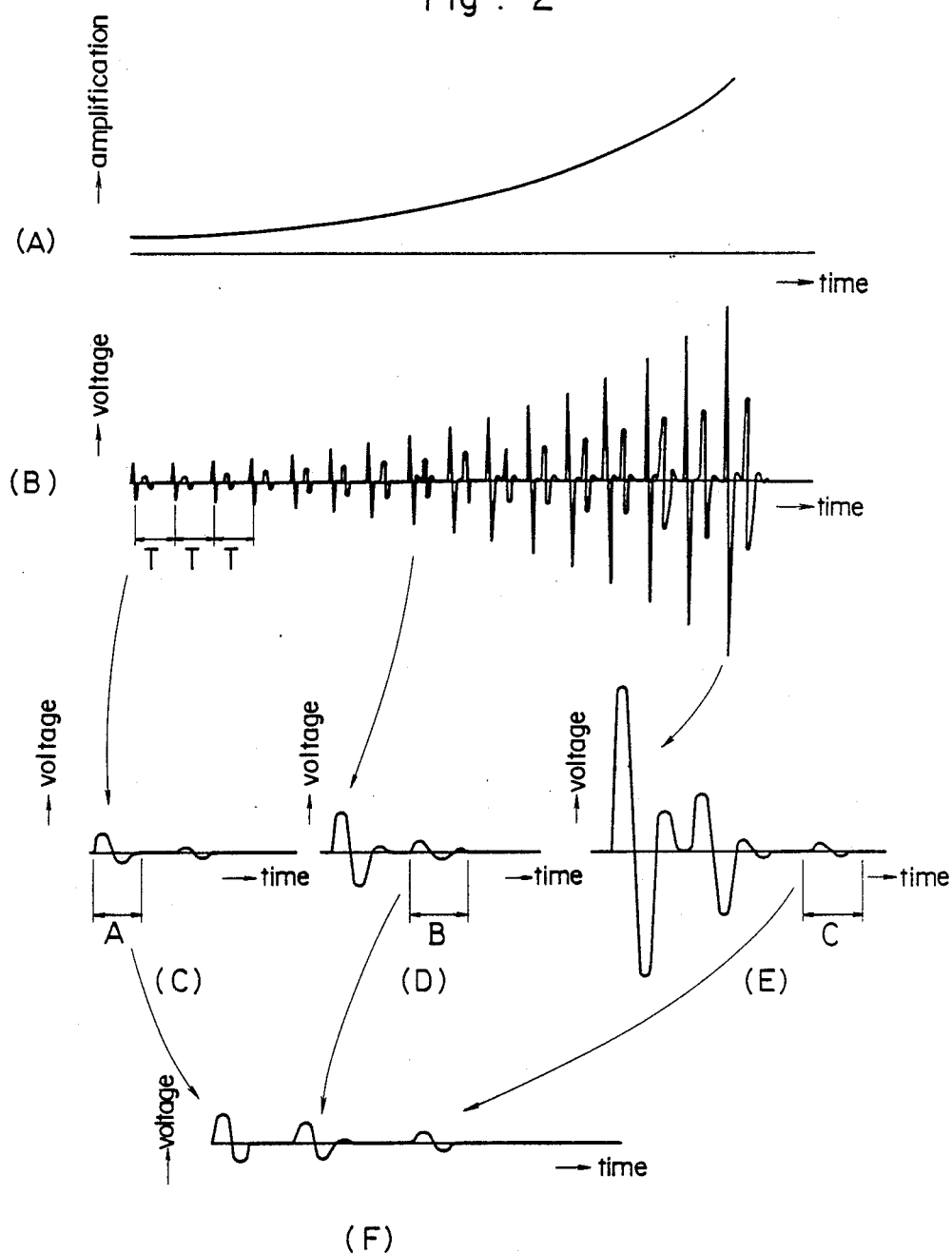
FIG. 2 is a waveform chart at every stage of the embodiment of FIG. 1.

FIG. 2 shows a waveform chart at every stage of FIG. 1, in which chart (A) indicates a time-dependent variation of the radio-frequency amplifier 9 in amplification, which increases as time goes on exponentially for example within 50 ms. Chart (B) shows a time-dependent variation of the radio-frequency amplifier 9 in output voltage, whose peak value also increases exponentially as in the case of the amplitude variation of the amplifier 9. Chart (C) shows an enlarged view of the reflected pulse where the sampling takes place at around t'=0 ns (the range of interval A succeedingly sampled) that is at around t=0 ms in the waveform of chart (B), chart (D) shows an enlarged view of the reflected pulse where the sampling takes place at around t'=50 ns (the range of interval B is succeedingly sampled) that is at around t=25 ms in the waveform of chart (B), and chart (E) shows an enlarged view of the reflected pulse wave where the sampling takes place at around t'=100 ns (the range of interval C is succeedingly sampled, that is at around t=50 ms in the waveform of chart (B). As seen from every chart, the instantaneous values of the reflected pulse at each sampling point shown in charts (C), (D) and (E) are made approximately equal due to the time-dependent increase of the amplification of the radio-frequency amplifier 9. As a result, the difference between the objects 8A and 8B in radio wave attenuation due to the difference in depth is compensated in a low-frequency signal shown chart (F) by an emphasis put on the peak caused by the reflection from the object 8B buried deeper than the object 8A. Thus, the heights of the peaks caused by the reflection from the objects 8A and 8B are made equal regardless of the depths of the objects 8A and 8B.

Figure 3:
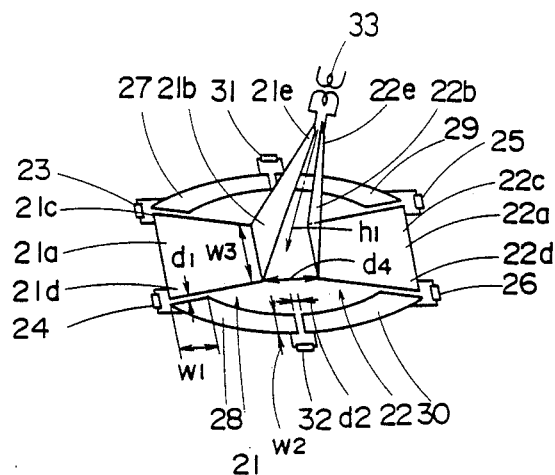
FIG. 3 is a perspective view of an antenna for underground searching used with the embodiment.
Figure 4:
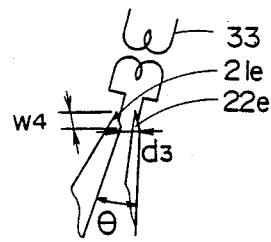
FIG. 4 is an enlarged perspective view of the main portion of FIG. 3.
Figure 5:
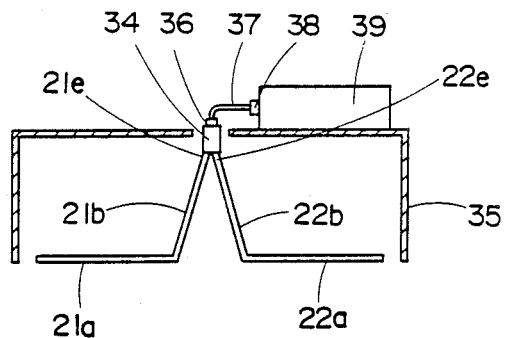
FIG. 5 is a sectional view showing the antenna of FIG. 3 contained within a housing.

Here an antenna for underground searching operation used as the transmitting antenna 2 and the receiving antenna 3 will be described referring to FIG. 3 through FIG. 7. This antenna comprises as shown in FIG. 3 and 4 a pair of antenna elements 21 and 22 which are made of plates shaped like an acute angled isosceles triangle bent obtuse in half with the fold line generally running parallel with the base thereof. The antenna elements 21 and 22 are symmetrically abutted to each other at their respective vertexes of the triangle portions 21b and 22b with their trapezium portions 21a and 22a laid in a plane. The antenna is further provided with plate-like conductors 27 through 30 which are respectively arranged on either respective sides of the trapezium portions 21a and 22a of the pair of antenna elements 21a and 22a in such a way that they are laid symmetrically in the same plane of the trapezium portions 21a and 22a.

The conductors 27 and 28 are respectively arranged with their one ends closely abutting with both base ends 21c and 21d of the trapezium portion 21a of the antenna element 21 with a fixed facing width. The conductors 29 and 30 are also respectively arranged with their one ends closely abutting with both base ends 22c and 22d of the trapezium portion 22a of the trapezium portion 22a of the antenna element 22 with a fixed facing width. The other ends of the conductors 27 and 29 are facing each other with a fixed width, and the other ends of the conductors 28 and 30 are also facing each other with a fixed width. Both longitudinal sides of the conductors 27 and 29 are respectively formed to have a curved line like an arc and their longitudinal sides are continuously arranged to be flush with each other at the other ends thereof and both longitudinal sides of the conductors 28 and 30 are also respectively formed to have a curved line like an arc and their longitudinal sides are continuously arranged to be flush with each other at the other ends thereof.

Further, load resistors of about 150 $\Omega$, 23 through 26, 31 and 32 are respectively connected between the base ends 21c, 21d, 22c and 22d and the conductors 27 through 30 as well as between the conductors 27 and 29, and between the conductors 28 and 30.

The vertexes 21e and 22e of the triangle portions 21b and 22b of the pair of the antenna elements 21 and 22 are feeding points to which the pulse generating unit (base band pulser) 4 is connected through a balun 33, and pulses from the pulse generating unit 4 are then transmitted through the pair of the antenna elements 21 and 22 as radio waves.

The vertexes 21e and 22e are fixed to an insulated balun case 34 which contains the balun 33, and a bottom opened housing 35 made of aluminum and lined with ferrite encloses the assembly including the pair of the antenna elements 21 and 22 together with the balun case 34. In this case, the plane in which the pair of the antenna elements 21 and 22 is arranged is made flush with the plane of the opening surface of the housing 35. The pair of the antenna elements 21 and 22 is connected to the pulse generating unit 4 in a circuit block 39 mounted on the rear side of the housing 35 through a connector 36 provided on the balun case 34, a coaxial cable 37, and a connector 38. The transmitting output from the pulse generating unit 4 in the circuit block 39 then fed to the pair of the antenna elements 21 and 22 through the connector 38, the coaxial cable 37, the connector 36, and the balun 33. Radio waves are then finally transmitted from this pair of the antenna elements 21 and 22.

Dimensions of each unit shown in FIG. 3 and FIG. 4 will now be described. Distance $d_1$ from both base ends 21c and 21d of the trapezium portion 21a and both base ends 22c and 22d of the trapezium portion 22a to one ends of the conductors 27 through 30 is set to be 0.5 mm for example, and a facing width $w_1$ is set to be 33 mm for example. Distance $d_2$ between the conductors 27 and 29, together with between the conductors 28 and 30 is set to be 0.5 mm for example, and a facing width $w_2$ is set to be 10 mm for example. These dimensions are not limited to the values mentioned above, but some increase or decrease therefrom is permitted.

The pair of antenna elements 21 and 22 has a height $h_1$ from the trapezium portions 21a and 22a to the vertexes 21e and 22e of the triangle portions 21b and 22b which is set to be 10 cm and a distance $d_3$ between the vertexes 21e and 22e of the triangle portions 21b and 22b is set to be 4 mm corresponding to the width of the inlet of the balun 33. Distance $d_4$ between the bottoms of the triangle portions 21b and 22b is set to be 45 mm. In this case, an angle $\theta$ made between the triangle portions 21b and 22b is approximately 20 degrees. The height $h_1$ from the trapezium portions 21a and 22a to the vertexes 21e and 22e of the triangle portions 21b and 22b is preferably set to be 10 cm or more, but it may be less than that value. The distance between the bases of the triangle portions 21b and 22b can be 30 to 50 mm to obtain sufficient operational performance of the antenna.

Base width $w_3$ of the triangle portions 21b and 22b is preferably set to be 1/1.5 to ½ of the distance $d_4$ between the bases of the triangle portions 21 and 22b, which has been found to obtain a satisfactory result in the range of 30 to 36 mm. The width $w_4$ of the vertexes 21e and 22e of the triangle portions 21b and 22 is set to be 1/1.24 of the distance $d_3$ between the vertexes 21e and 22e of the triangle portions 21b and 22b according to the literature concerned, taking the output impedance of the balun 33 of 200 $\Omega$ into consideration. This value can also be changed to a certain extent.

The radius of curvature of the folded portions in the pair of the antenna elements 21 and 22 is preferably as small as possible. However, in the case where the radius of curvature is relatively large and the pair of antenna elements 21 and 22 is bent like an arc, the directivity thereof is still satisfactory although the output is somewhat decreased.

Figure 11:
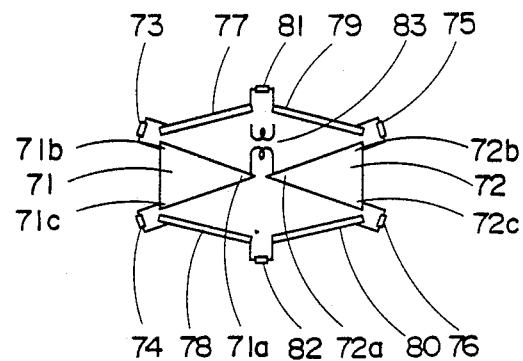
FIG. 11 is a plan view showing the construction of the antenna for use with the conventional radar type underground searching apparatus.
Figure 12:
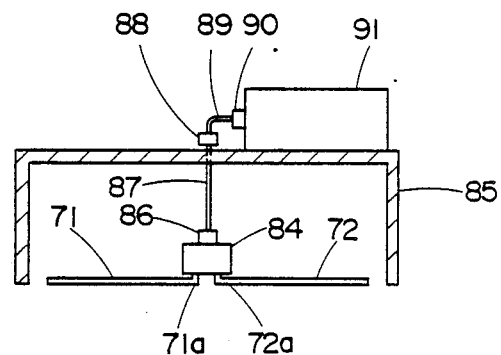
FIG. 12 is a sectional view showing the antenna of FIG. 11 contained within a housing.

The difference between the antenna of the embodiment of the present invention (see FIG. 3 through FIG. 5) and the conventional antenna (see FIG. 11 and FIG. 12) in directivity will now be explained.

To determine the directivity concerned a receiving antenna composed of a miniature dipole was laid in a depth of 50 cm from the ground surface in the ground and radio waves were transmitted into the ground using an antenna of the embodiment in such a way that the antenna was moved in the longitudinal direction of the pair of the antenna elements 21 and 22 along a line on the ground surface which passed through a point directly above the receiving antenna in the ground, and the received signal level by receiving antenna was measured. At the same time, the antenna was moved in the direction perpendicular to the longitudinal direction of the antenna elements 21 and 22 along a line on the ground surface which passed through a point directly above the receiving antenna in the ground, and the received signal level by the receiving antenna was measured. For comparison, a receiving antenna composed of a miniature dipole was lain in a depth of 50 cm from the ground surface in the ground and radio waves were transmitted into the ground using an antenna of the conventional type in such a way that the antenna was moved in the longitudinal direction of the pair of the antenna elements 71 and 72 along a line on the ground surface which passed through a point directly above the receiving antenna in the ground, and the received signal level by the receiving antenna was measured. At the same time, the antenna was moved in the direction perpendicular to the longitudinal direction of the antenna elements 71 and 72 along a line on the ground surface which passed through a point directly above the receiving antenna in the ground, and the received signal level by the receiving antenna was measured. The results are shown in the following table together with FIGS. 6 and 7. The antennas of the embodiment and the conventional type used were contained within a housing 15 and a housing 45 respectively which are 60 cm in width, 50 cm in depth and 10 cm in height with an opening at the bottom thereof and radio waves were transmitted from these antennas housed therein.

The following table shows the received signal levels which are obtained with radio waves transmitted at different distances of 0 cm, 5 cm and 10 cm over the point on the ground surface directly above the receiving antenna, making the level at 0 cm to be the reference (1.0). In the following table, line (1) denotes results in a measurement in which radio waves are transmitted from the ground surface into the ground while the antenna of the embodiment is moved in the direction perpendicular to the longitudinal direction of the pair of the antenna elements 21 and 22, and the received signal level by the receiving antenna is measured; line (2) denotes results are in a measurement in which radio waves are transmitted from the ground surface into the ground while antenna of the embodiment is moved in the longitudinal direction of the pair of the antenna elements 21 and 22, and the received signal level by the receiving antenna is measured; line (3) denotes results in a measurement in which radio waves are transmitted from the ground surface into the ground while the antenna of the conventional type is moved in the direction perpendicular to the longitudinal direction of the pair of the antenna elements 71 and 72, and the received signal level by the receiving antenna is measured, and line (4) denotes results in a measurement in which radio waves are transmitted from the ground surface into the ground while the antenna of the conventional type is moved in the longitudinal direction of the pair of the antenna elements 71 and 72, and the received signal level by the receiving antenna is measured.

TABLE 3

| | Distance | | |
|---|---|---|---|
| | 0 cm | 5 cm | 10 cm |
| (1) | 1.0 | 0.95 | 0.87 |
| (2) | 1.0 | −.94 | 0.80 |
| (3) | 1.0 | 0.95 | 0.87 |
| (4) | 1.0 | 0.95 | 0.87 |

Figure 6:
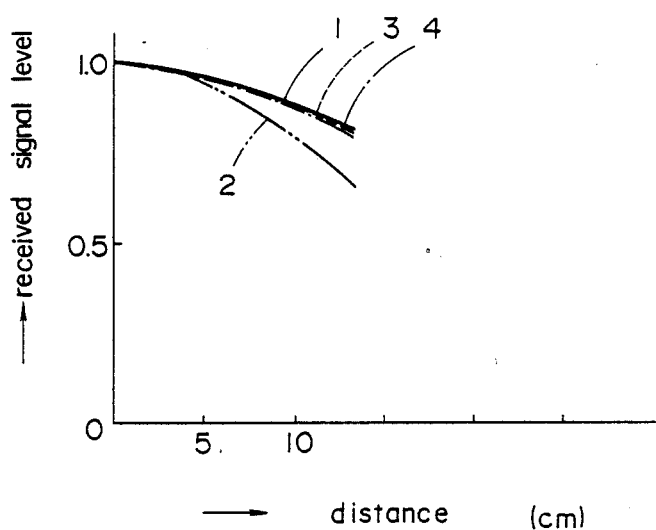
FIG. 6 is a characteristic view showing directivities of the conventional antenna and the antenna of the present invention for underground searching.

FIG. 6 shows the data of Table 3 graphically in which the horizontal axis represents the distance from the point on the ground surface directly above the receiving antenna and the vertical axis represents the received signal level, and the reference numerals (1) through (4) correspond to the symbols (1) through (4) in Table 3.

From FIG. 6 it can be seen that a falling gradient of the received signal level with respect to the distance is greater in the case (2) when the received signal level is measured while the antenna is moved in the longitudinal direction of the pair of the antenna elements 21 and 22 than in the case (1) when the received signal level is measured while the antenna is moved in the direction perpendicular to the pair of antenna elements 21 and 22. This means that the directivity of the antenna of the embodiment is narrows in the longitudinal direction of the pair of the antenna elements 21 and 22 than in the direction perpendicular to the longitudinal direction of the pair of the antenna elements 21 and 22. Also, it can be seen that in the antenna of the conventional type, a falling gradient of the received signal level with respect to the distance is approximately the same in the case (4) when the received signal level is measured while the antenna is moved in the longitudinal direction of the pair of the antenna elements 71 and 72 and in the case (3) when the received signal level is measured while the antenna is moved in the direction perpendicular to the longitudinal direction of the pair of the antenna elements 71 and 72. This means that the directivity of the antenna of the conventional type is approximately the same in the direction perpendicular to the longitudinal direction of the pair of the antenna elements 71 and 72 and in the longitudinal direction of the pair of the antenna elements 71 and 72.

In FIG. 6, lines connecting the points 5 cm and 10 cm above the ground surface to the receiving antenna are respectively about 5.7 degrees and 11.3 degrees with respect to a perpendicular line.

Figure 7:
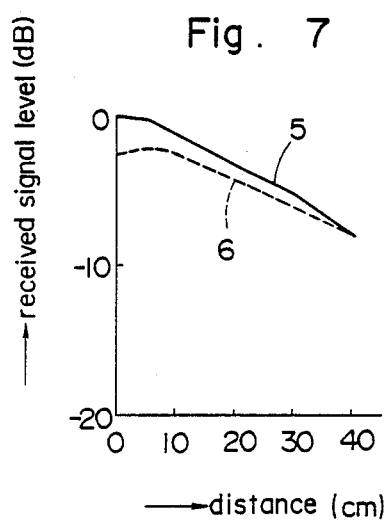
FIG. 7 is a characteristic view showing radiation efficiencies of the conventional antenna and the antenna of the present invention for underground searching.
Figure 8:
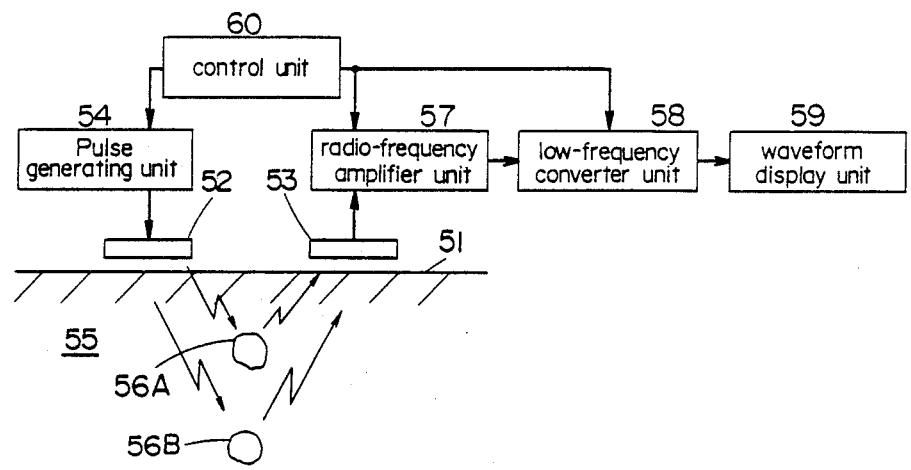
FIG. 8 is a block diagram of the conventional underground searching apparatus.
Figure 9:
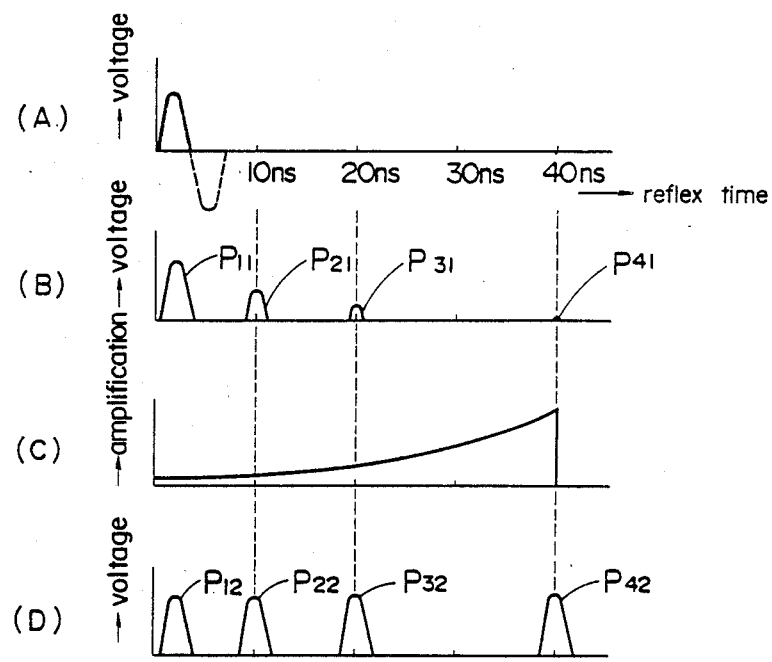
FIG. 9 is a timing chart at every stage of the apparatus of FIG. 8.
Figure 10:
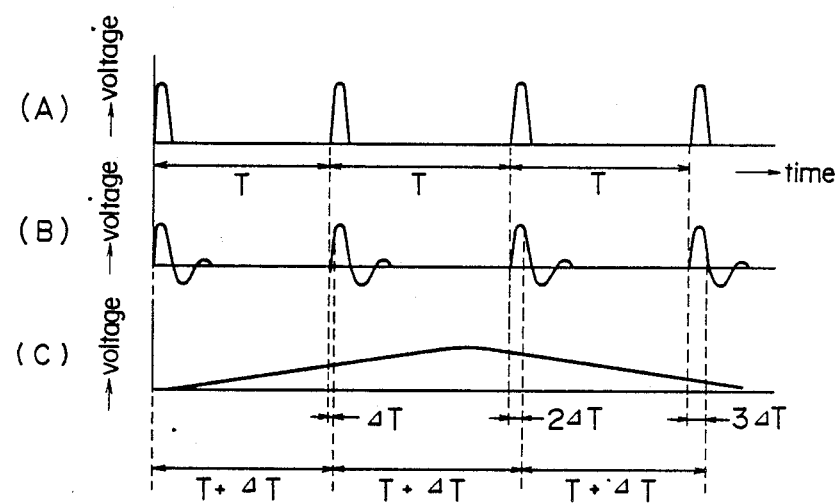
FIG. 10 is a view to exaplain the sampling operation.

FIG. 7 shows the received signal levels at different distances of 5 cm, 10 cm, ... above the ground surface using the antenna of the embodiment and the antenna of the conventional type respectively, making the received signal level to be the reference (0 dB) when radio waves are transmitted at the point on the ground surface directly above the receiving antenna, that is, the distance from that point is 0 cm. In FIG. 7, curve (5) shows results in a measurement in which radio waves are transmitted from the ground surface into the ground while the antenna of the embodiment is moved in the longitudinal direction of the pair of the antenna elements 21 and 22, and the received signal level by the receiving antenna is measured, and curve (6) shows results in a measurement in which radio waves are transmitted from the ground surface into the ground while the antenna of the conventional type is moved in the longitudinal direction of the pair of the antenna elements 71 and 72, and the received signal level is measured.

From FIG. 7 it can be seen that the received signal level when radio waves are transmitted while the antenna of the embodiment is moved in the longitudinal direction of the pair of the antenna elements 21 and 22 is greater than, in the range of short distances, the received signal level when radio waves are transmitted while the antenna of the conventional type is moved in the longitudinal direction of the pair of the antenna elements 71 and 72. This means that the antenna of the embodiment has a higher radiation efficiency of radio waves than the antenna of the conventional type.

As mentioned above, the radar type underground searching apparatus of the embodiment of the present invention transmits pulses periodically and receives corresponding reflected pulses. By sampling the output of the radio-frequency amplifier 9 with a sample period which is longer than the transmitting period T of pulses by $\Delta T$, that is, by sampling each reflected wave one by one at a series of timing, each being succeedingly delayed by a fixed period, a low-frequency signal which is formed by extending these pulses in time base is obtained. In the apparatus thus arranged the amplification of the radio frequency amplifier 9 is made increased as time goes on within an interval of 50 ms (at every pulse transmission) so that the difference in radio wave attenuation due to the difference in depth is compensated in the low-frequency signal by an emphasis put on the peak caused by the reflection from the object 8B buried deeper than the object 8A. Thus, the heights of the peaks caused by the reflection from the objects 8A and 8B are made equal regardless of the depth of the objects 8A and 8B. In addition, since the period by which the amplification of the radio-frequency amplifier 9 is changed is more than 50 ms according to the embodiment of the present invention unlike the conventional apparatus in which the amplification is changed within 100 ns, the change of the amplification is performed very easily.

The antenna of the embodiment comprises a pair of antenna elements 21 and 22 made of a pair of plates shaped like an acute angled isosceles triangle bent obtuse angled in half and the pair of the antenna elements 21 and 22 is symmetrically abutted to each other at their respective vertexes of the triangle portions 21b and 22b. Because of this construction, the pair of the antenna elements 21 and 22 can be made to have a nanrrow directivity along the longitudinal direction thereof, and by performing searching operation while moving the pair of the antenna elements 21 and 22 along its longitudinal direction, the detection accuracy for buried objects can be improved and the radiation efficiency of radio waves can be increased as well.

Since the directivity of the pair of the antenna elements in the direction perpendicular to the longitudinal direction thereof remains to be wide, by performing searching operation while moving the pair of the antenna elements 21 and 22 along its direction perpendicular to the longitudinal direction thereof, the presence and location of objects buried in the ground in a wide area can be detected, although roughly, in a relatively short period. Thus, by combining the searching procedures mentioned above, that is, by performing searching operation in both longitudinal direction of the pair of the antenna elements 21 and 22 and the direction perpendicular thereto, a searching operation for objects buried in the ground in a wide range can be performed in a short period with a high degree of accuracy. In addition, because of the structure of the antenna of the embodiment in which a pair of the antenna elements 21 and 22 made of a pair of plates shaped like an acute angled isosceles triangle bent obtuse angled in half and the pair of the antenna elements 21 and 22 is symmetrically abutted to each other at their respective vertexes of the triangle portions 21b and 22b, the pair of the antenna elements 21 and 22 is formed in a three-dimensional shape. When installing the pair of the antenna elements 21 and 22 in the housing 35 to compose the antenna radiating radio waves within the housing 35, the balun case 34 fixed to the vertexes 21e and 22e of the triangle portions 21b and 22b can be made protoruding out of the rear surface of the housing 35 by setting the height $h_1$ from the trapezium portions 21a and 22a to the vertexes 21e and 22e of the triangle portions 21b and 22b approximately equal to the height of the housing 35. As a result, a space distance between the balun case 34 and the circuit block 39 can be reduced when connecting the circuit block 39 mounted on the rear surface of the housing 35 to the balun case 34. Accordingly, the number of connectors required can be reduced to result in a simplified structure and a limited ringing due to the reduction of undesired reflection caused by connectors.

A single antenna may be used in common for both the transmitting antenna 2 and the receiving antenna 3.

Although the pair of the antenna elements 21 and 22 has been described to be formed of a pair of acute angled isosceles plates bent obtuse angled in half, the shape of the plates may not necessarily be an exact acute angled isosceles but a similar shape thereto may be used.

The radar type underground searching apparatus according to the present invention is suitable for an application in which the presence and location of buried objects such as buried gas pipes in the ground are detected without performing excavating work.

What is claimed is:

1. A radar type underground searching apparatus comprising:
    a pulse generating unit for periodically generating pulses having a fixed peak value;
    a transmitting antenna for transmitting the pulses generated by said pulse generating unit from the ground surface into the ground;
    a receiving antenna for catching reflected pulses caused by objects buried in said ground;
    a housing for screening electromagnetic radiation and having one side open, said transmitting antenna and said receiving antenna being disposed in said housing;
    a radio-frequency amplifier for amplifying a reflected wave corresponding to each of said pulses with an amplification which increases each time pulses are transmitted;
    a sampler for obtaining a low-frequency signal formed by the extension of said reflected wave in time base by sampling the output of said radio-frequency amplifier at a series of sampling times, each being succeedingly delayed by a fixed period from the transmitting timing of each pulse wave; and
    a waveform display unit for displaying the waveform of a low-frequency signal appearing at the output of said sampler;
    said transmitting antenna and said receiving antenna including:
    a pair of antenna elements each made of a plate shaped like an isosceles triangle bent to form an obtuse angle between a vertex portion and a trapezium portion and having a fold line between said vertex portion and said trapezium portion generally running parallel with the trapezium base of said isosceles triangle and nearly symmetrically abutted to each other at each said vertex portion, each said vertex portion having a height arranged approximately equal to the height of said housing, and each said trapezium portion lying in the same plane in general as the open side of said housing;
    a first load resistor and a second load resistor each connected at one of their ends to respective ends of the trapezium base of one antenna element of said pair of antenna elements;
    a third load resistor and a fourth load resistor each connected at one of their ends connected to respective ends of the trapezium base of the other antenna element of said pair of antenna elements;
    a first conductor and a second conductor each connected at one of their ends to respective other ends of said first resistor and said second resistor;
    a third conductor and a fourth conductor each connected at one of their ends to respective other ends of said third resistor and said fourth resistor;
    a fifth load resistor connected between said first conductor and said third conductor; and
    a sixth load resistor connected between said second conductor and said fourth conductor;
    whereby the presence of said objects is detected by the presence of peaks in said low-frequency signal caused by the reflection from said objects and the depth of said objects is detected by the time of the appearance of said peaks.

* * * * *